United States Patent
Hagen et al.

(10) Patent No.: US 6,581,533 B1
(45) Date of Patent: Jun. 24, 2003

(54) SEED METER BRUSHES FORMING A TRANSPORT SEED PUDDLE

(75) Inventors: Matthew Brian Hagen, Bettendorf, IA (US); James Irwin Lodico, Hampton, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/021,584

(22) Filed: Dec. 18, 2001

(51) Int. Cl.$^7$ .................................................. A01C 7/18
(52) U.S. Cl. ........................ 111/174; 111/170; 111/181
(58) Field of Search ............................... 111/52, 53, 59, 111/13, 18, 22, 200, 8, 9, 14, 85, 34, 35, 63, 170, 177, 186, 74, 75, 76, 77, 179, 181, 182

(56) References Cited

U.S. PATENT DOCUMENTS

| | | | |
|---|---|---|---|
| 4,137,852 A | | 2/1979 | Pratt .............................. 111/57 |
| 5,058,766 A | * | 10/1991 | Deckler ........................ 221/254 |
| 5,170,909 A | | 12/1992 | Lundie et al. ............... 221/211 |
| 5,325,800 A | | 7/1994 | Wisor et al. ................. 111/185 |
| 5,720,233 A | | 2/1998 | Lodico et al. ............... 111/184 |
| 5,740,746 A | * | 4/1998 | Ledermann et al. ........ 111/174 |
| 6,047,652 A | * | 4/2000 | Prairie et al. ................ 111/174 |
| 6,273,010 B1 | * | 8/2001 | Luxon ......................... 111/184 |
| 6,494,154 B2 | * | 12/2002 | Kinzenbaw et al. .......... 111/54 |

OTHER PUBLICATIONS

Brochure "Semeadora Para Graos Graudos Par 5000/6000/7000 Trans", date unknown; 11 pp.

* cited by examiner

*Primary Examiner*—Thomas B. Will
*Assistant Examiner*—Nathan Mammen

(57) ABSTRACT

A seeding machine having a main seed hopper is in communication with a planting unit by a flexible tube. The planting unit has a horizontal working position and a vertical transport position. The main hopper supplies seed by gravity to the planting unit through the flexible tube. The planting unit is provided with a vacuum seed meter. The seed meter has a seed disc with a vacuum side and a working seed puddle side. An isolator brush, arranged in a chordal manner on the seed puddle side of the seed disc, defines the discharge area of the seed meter. A first brush intersecting the isolator brush extends downwardly and radially inward along the seed disc. The first brush, together with the isolator brush, defines boundaries of a transport seed puddle when the planting unit is pivoted into its vertical transport position. A second brush extends downwardly and radially inward along the seed disc. The first and second brushes define a seed return gap through which seed from the top of the seed meter can be returned to the working seed puddle.

17 Claims, 4 Drawing Sheets

SEED METER BRUSHES FORMING A TRANSPORT SEED PUDDLE

FIELD OF THE INVENTION

The present invention is directed to first and second brushes that are located in a seed meter to prevent the loss of seed from the seed meter when the planting unit is raised on its nose from its horizontal working position to its vertical transport position.

BACKGROUND OF THE INVENTION

Row crop planters are seeding machines used to plant row crops. Typically row crop planters are provided with a number of planting units. Each planting unit comprises a seed hopper, a seed meter, a furrow opener with depth gauge wheels, closing wheels, and a seed tube. The seed hopper delivers seed to the seed meter. The seed meter, in turn, meters the seed and discharges the metered seed to a seed tube. The furrow opener with depth gauge wheels forms a planting furrow of the correct depth. The metered seed is discharged into the planting furrow by the seed tube. The planting furrow is closed by closing wheels that seal the seed in the planting furrow.

Seed meters may be of a mechanical type or pneumatic type. Pneumatic seed meters include vacuum seed meters wherein a vacuum is used to draw seed to a seed disc and positive pressure systems. A mechanical type seed meter is disclosed in U.S. Pat. No. 5,720,233 and a vacuum type seed meter is disclosed in U.S. Pat. No. 4,836,412.

Unit hoppers on planting units have also been supplied seed from a main hopper. An example of such a system is disclosed in U.S. Pat. No. 5,392,722.

In addition, it is also known to seal a seed meter as it is moved from a working position to a transport position. An example of this is disclosed in U.S. Pat. No. 5,325,800.

It is also known to pivot planting units vertically on their noses from a horizontal working position to a vertical working position.

SUMMARY

It is an object of the present invention to provide an internal brush assembly in a seed meter that retains seed in the seed meter when the planting unit is pivoted vertically on its nose from its horizontal working position to its vertical transport position.

The planting unit is coupled to a frame having a main seed hopper. The main seed hopper is coupled to the planting unit by a flexible tube. The main hopper supplies seed by gravity to the planting unit through the flexible tube. The planting unit comprises a unit hopper and a seed meter. Seed is metered by the seed meter before being discharged to a seed tube and eventually a planting furrow. Seed from the flexible tube passes through the unit hopper to the seed meter. The seed forms a working seed puddle in the seed meter. As the planting unit is pivoted on its nose from its horizontal working position to its vertical transport position some seed from the working seed puddle is trapped in the seed meter by the first and second brushes.

The first and second brushes extend downwardly and radial inward along the seed disc to define a seed return gap for seed falling from the upper portions of the seed disc.

DETAILED DESCRIPTION

Figure 1:
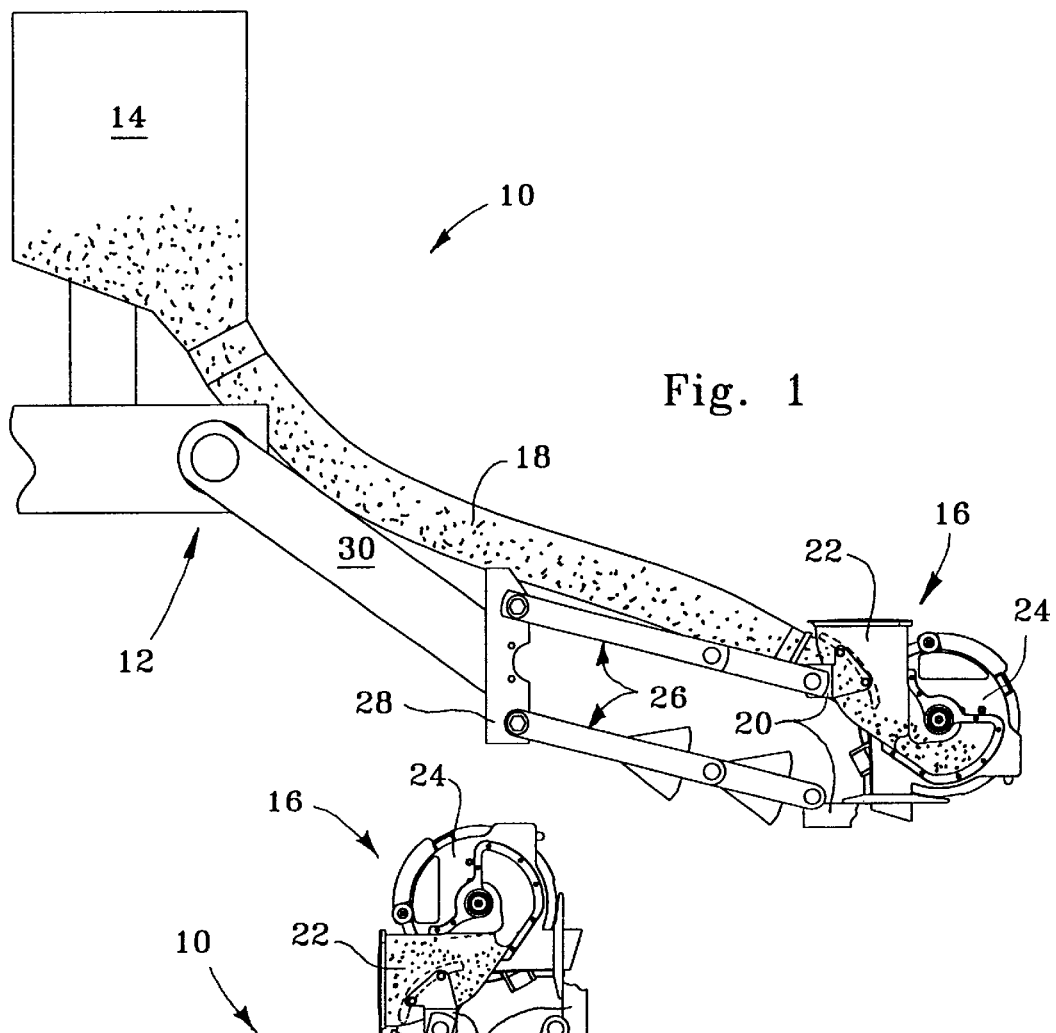
FIG. 1 is a side view of the seeding machine with the planting unit in its horizontal working position.

Seeding machine 10 comprises a frame 12, a main seed hopper 14, a planting unit 16 and a flexible tube 18. Seed contained in the main hopper 14 is transmitted by gravity to the planting unit 16 through the flexible tube 18. The planting unit 16 comprises a planting unit frame 20 on which are mounted unit hopper 22 and a vacuum seed meter 24. Although not illustrated, a furrow opener with depth gauging wheels would also be mounted to the planting unit frame as would a seed tube and closing wheels. The furrow opener would be used to form a planting furrow. The seed tube would direct metered seed from the seed meter 24 to the planting furrow. The closing wheels would close the planting furrow sealing the seed in the furrow. The furrow opener with depth gauging wheels, the seed tube and the closing wheels are conventional and well known in the art.

Figure 2:
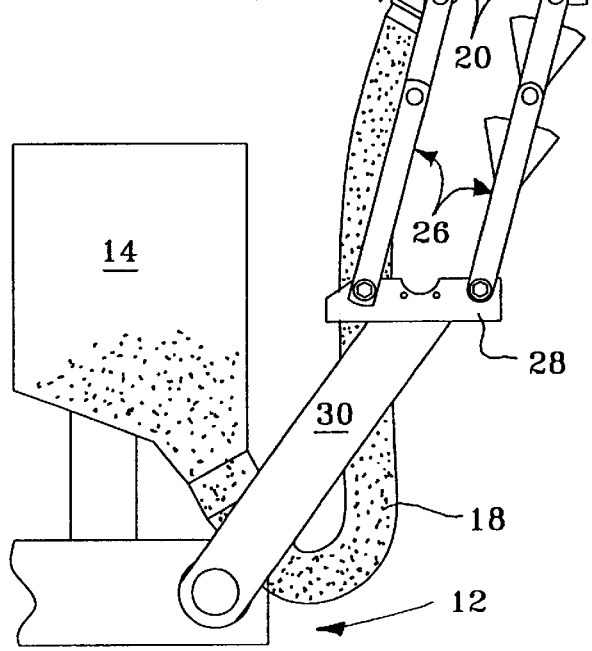
FIG. 2 is a side view of a seeding machine with the planting unit in its vertical transport position.

The planting unit 16, illustrated in FIG. 1, is in its horizontal working position. To reduce the size of the transport package the planting unit 16 can be pivoted into its vertical transport position, as illustrated in FIG. 2. The planting unit is also provided with a four-bar linkage 26 extending between the planting unit frame 20 and mounting plate 28. Mounting plate 28 is mounted to the pivoting mechanism 30 of the frame 12. The four-bar linkage 26 allows the planting unit to follow the ground when it is in its horizontal working position.

Figure 3:
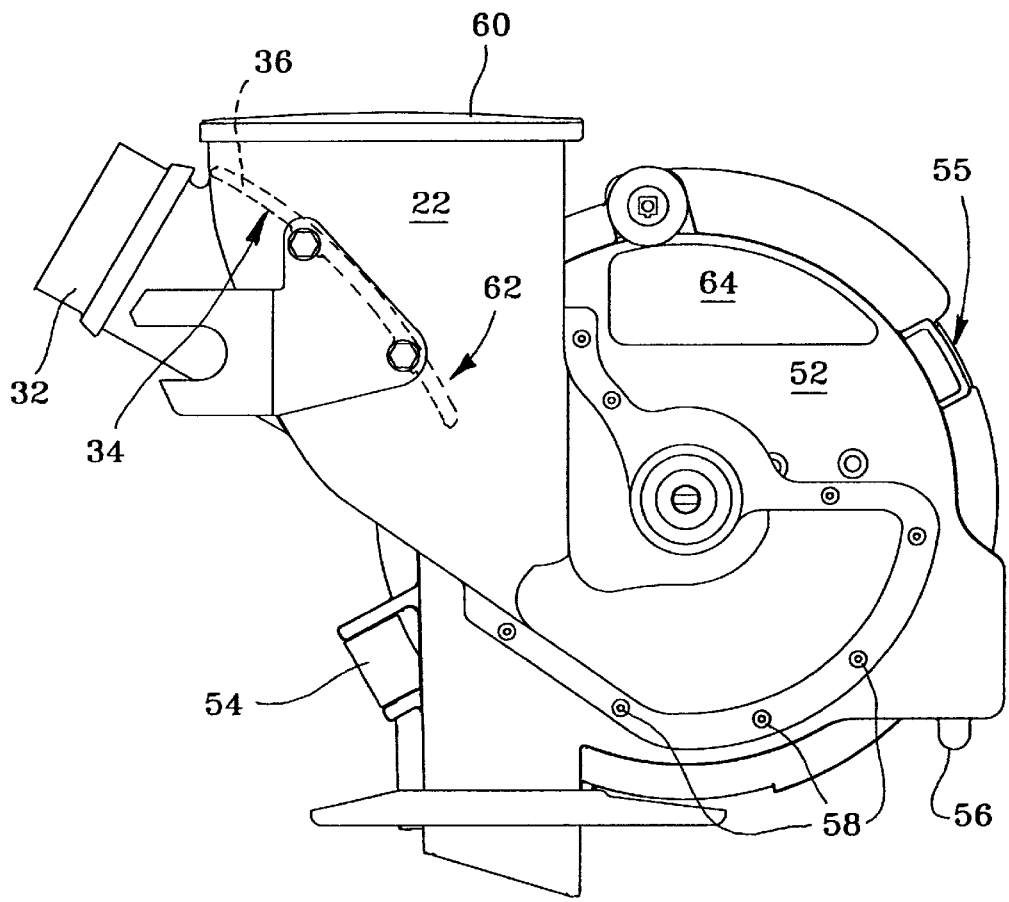
FIG. 3 is a close up side view of the seed meter and unit hopper of the planting unit.
Figure 4:
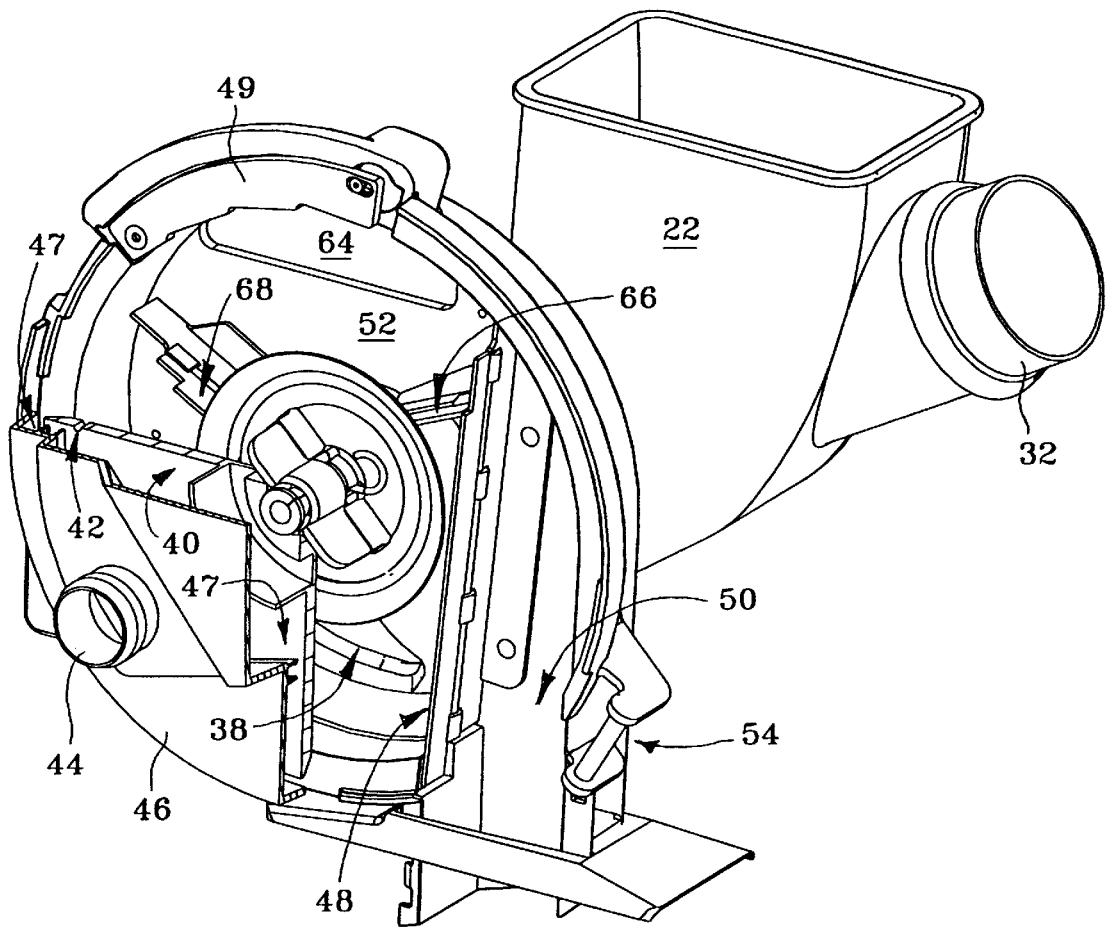
FIG. 4 is a perspective partial cross sectional view of the seed meter and unit hopper of the planter unit.

The inventive features of the planting unit 16 are best illustrated in FIGS. 3 and 4. Seed from the main hopper 14 passes through flexible tube 18 to the unit hopper 22. The unit hopper is provided with an inlet 32, which is coupled to the flexible tube 18. The seed passes beneath the concave surface 34 of baffle 36 and through entrance passage 38 into the seed meter 24. The seed forms a working seed puddle against the seed disc 40. The seed disc 40 is a conventional vacuum seed disc being provided with a series of circumferentially spaced apertures 42. Each aperture corresponds to an individual seed cell on the seed disc 40. The seed cells come into contact with seeds located in the working seed puddle.

A vacuum is applied to the side of the seed disc 40 opposite from the working seed puddle. The vacuum source is typically a fan driven by a hydraulic motor that transmits the vacuum through hoses connected to fitting 44 located on vacuum housing member 46 of the seed meter 24. An air seal 47 is mounted to the vacuum housing member 46. The seal contacts the seed disc forming an air seal therewith. As viewed in FIG. 4 the seed disc rotates in a clockwise direction. The vacuum draws seeds to the seed cells. As the seed cells are rotated through the working seed puddle seed attach to the seed cells and are rotated upwardly out of the seed puddle. A double eliminator 49 for knocking extra seeds from the seed cells is located at the top of the seed meter. The single seed containing seed cells are then rotated past brush 48 into discharge area 50. In the discharge area 50 the vacuum is blocked from the apertures 42 by the arrangement of the air seal 47. Terminating the vacuum releases the seed from the seed disc 40. The seed moves downwardly through the discharge area 50 by gravity, out of the seed meter 24 into a seed tube and eventually into the planting furrow.

The vacuum housing member 46 is hingedly coupled to the unit hopper housing member 52 by hinge 54. A latch 55 is located opposite from the hinge 54 and latches the vacuum housing member 46 to the unit hopper housing member 52. The unit hopper housing member 52 is provided with a locating button 56. The locating button 56 facilitates assembly of the seed meter 24 and unit hopper 22 onto the planting unit frame 20.

The unit hopper 22 is plastic and is attached to the unit hopper housing member 52 by fasteners 58. The unit hopper 22 has an open top that is enclosed by detachable cover 60. As the planting unit 16 is pivoted from its horizontal working position to its vertical transport position, seed in the seed meter 24 flows towards the flexible tube 18. Seed from the seed meter 24 flows over the convex surface 62 of the baffle 36 and is held in the unit hopper 22, as shown in FIG. 2.

The top of the of the unit hopper housing member 52 is provided with an opening 64 through which air is drawn by the vacuum seed meter 24. Typically this opening is provided with a clear plastic window having louvers. The louvers allow air to enter the seed meter. The clear plastic window provides an inspection window for the seed meter. The louvered window is not illustrated in the drawings.

Figure 5:
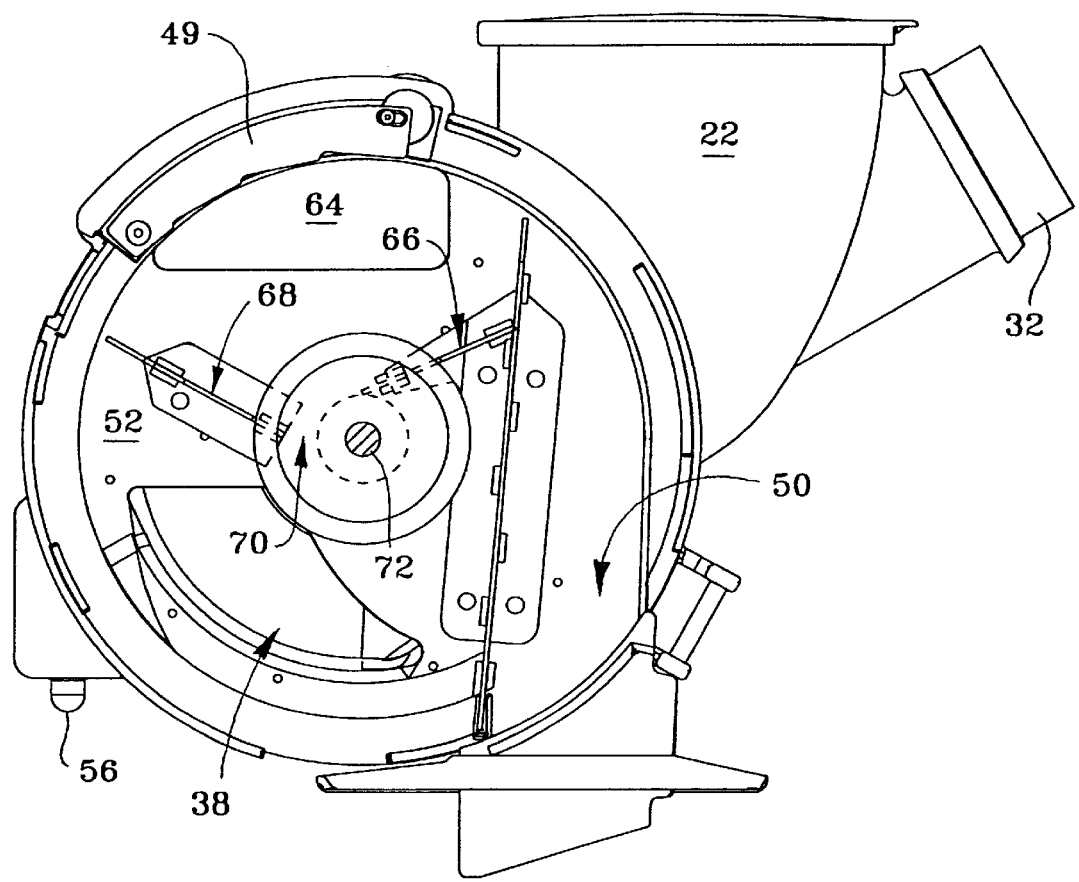
FIG. 5 is a side view of the of the planter unit seed meter housing member illustrating the brush assemblies.

The seed meter is provided with two additional brush assemblies 66 and 68 located between the working seed puddle and the opening 64. The first brush 66, as illustrated in FIGS. 4 and 5, extends from the 2:00 o'clock position downward and radially inward to a location above the seed meter drive axle 72. The second brush 68 extends from the 10:00 o'clock position radially inward to a location spaced from the seed meter drive axle. A seed return gap 70 is formed between the drive axle 72 and the second brush 68. The seed return gap 70 is used to return extra seed released from the seed cells by the double eliminator to the seed puddle. As such, both brush assemblies 66 and 68 extend downwardly and inwardly from the outer portions of the seed disc 40 into a V with the seed return gap 70 formed at the apex.

After a seeding operation the vacuum source is turned off releasing seed from the seed disc 40. Seed located above the first and second brushes 66 and 68 is directed to the seed return gap by the brushes.

As the planting unit is pivoted form its horizontal working position to its vertical transport position most of the seed in the working seed puddle passes through passage 38 and is deflected by baffle 36 into the unit hopper 22. However, a portion of the seed remains in the seed meter forming a smaller transport seed puddle against isolator brush 48 and first brush 66, see FIG. 2. Second brush 68 prevents seed in this transport seed puddle from bouncing out of the seed puddle and falling into the discharge area 50 of the seed meter 24.

Having described the preferred embodiment, it will become apparent that various modifications can be made without departing from the scope of the invention. For example, a mechanical seed meter or a positive pressure pneumatic seed meter may be used in place of the vacuum seed meter disclosed in the specification above. Similarly, the seed can be directed to the individual unit hoppers by a pneumatic seed on demand system from a central hopper, instead of a using the gravity delivery system disclosed in the specification above. Therefore the present invention should be limited solely by the claims that follow.

What is claimed is:

1. A seeding machine comprising:

a frame;

a main hopper mounted to the frame;

a planting unit pivotally mounted to the frame, the planting unit having a horizontal working position and a vertical transport position, the planting unit having a seed meter for metering seed, the seed meter being provided with a seed disc, the seed disc having a top portion;

a tube extends between the main hopper and the seed meter for transmitting seed from the main hopper to the seed meter, seed transmitted from the main hopper to the seed meter forms a working seed puddle in the seed meter when the planting unit is in its horizontal working position;

an isolator brush extends in a chordal manner along the seed disc, the isolator brush defining a discharge area in the seed meter;

a first brush is mounted to the seed meter and extends downwardly and radially inwardly from the isolator brush along the seed disc, when the planting unit is pivoted from its horizontal working position to its vertical transport position some of the seed in the working seed puddle is retained in a transport seed puddle formed by the first brush.

2. A seeding machine as defined by claim 1 wherein the seed meter is provided with a second brush that extends downwardly and radially inwardly along the seed disc, the first and second brushes define a seed return gap through which seed from the top portion of the seed disc can be returned to the working seed puddle.

3. A seeding machine as defined by claim 2 wherein the seed meter is a vacuum seed meter.

4. A seeding machine as defined by claim 3 wherein the tube is flexible.

5. A seeding machine as defined by claim 4 wherein the main hopper is located above the planting unit when the planting unit is in its horizontal working position so that seed is fed by gravity through the tube from the main hopper to the planting unit.

6. A seeding machine as defined by claim 5 wherein the planting unit is provided with a unit hopper.

7. A seeding machine as defined by claim 6 wherein the planting unit is coupled to the frame by a linkage that allows the planting unit to follow the ground hen it is in its horizontal working position.

8. A seeding machine comprising:

a frame;

a main hopper mounted to the frame;

a planting unit pivotally mounted to the frame in communication with the main hopper, the planting unit having a horizontal working position and a vertical transport position, the planting unit having a seed meter for metering seed, the seed meter being provided with a seed disc, the seed disc having a top portion, seed transmitted from the main hopper to the seed meter forms a working seed puddle in the seed meter when the planting unit is in its horizontal working position;

an isolator brush extends in a chordal manner along the seed disc, the isolator brush defining a discharge area in the seed meter;

a first brush is mounted to the seed meter and extends downwardly and radially inwardly from the isolator brush along the seed disc, when the planting unit is pivoted from its horizontal working position to its vertical transport position some of the seed in the working seed puddle is retained in a transport seed puddle formed by the first brush.

9. A seeding machine as defined by claim 8 wherein the seed meter is provided with a second brush that extends downwardly and radially inwardly along the seed disc, the first and second brushes form a seed return gap through which seed from the top portion of the seed disc can be returned to the working seed puddle.

10. A seeding machine as defined by claim 9 wherein the seed meter is a vacuum seed meter.

11. A seeding machine as defined by claim 10 wherein the main hopper is located above the planting unit when the planting unit is in its horizontal working position so that seed is fed by gravity from the main hopper to the planting unit.

12. A seeding machine as defined by claim 11 wherein the planting unit is provided with a unit hopper.

13. A seeding machine as defined by claim 12 wherein the planting unit is coupled to the frame by a linkage that allows the planting unit to follow the ground when it is in its horizontal working position.

14. A seed meter for metering seed, the seed meter comprising:

a seed meter housing, a seed disc located in the housing, the seed disc having a top portion;

an inlet in the housing for receiving seed, the seed forming a working seed puddle along side the seed disc;

an outlet in the housing through which metered seed is discharged;

an isolator brush extends in a chordal manner along the seed disc adjacent to the outlet, the isolator brush defining a discharge area in the seed meter;

a first brush is mounted to the seed meter housing and extends downwardly and radially inwardly from the isolator brush along the seed disc, when the planting unit is pivoted from its horizontal working position to its vertical transport position some of the seed in the working seed puddle is retained in a transport seed puddle formed by the first brush.

15. A seed meter as defined by claim 14 wherein the first brush and the isolator brush intersect to form the boundaries of the transport seed puddle.

16. A seed meter as defined by claim 15 wherein the seed meter is provided with a second brush that extends downwardly and radially inwardly along the seed disc, the first and second brushes form a seed return gap through which seed from the top portion of the seed disc can be returned to the working seed puddle.

17. A seed meter as defined by claim 16 wherein the seed meter is a vacuum seed meter and the seed disc has a vacuum side and a seed puddle side, the first and second brushes and the isolator brush contact the seed puddle side.

* * * * *